Aug. 28, 1945.  A. RIDD  2,383,685
VULCANIZING APPARATUS
Filed Dec. 20, 1943  2 Sheets-Sheet 1

Ambrose Ridd
INVENTOR.

BY
ATTORNEYS.

Aug. 28, 1945.  A. RIDD  2,383,685

VULCANIZING APPARATUS

Filed Dec. 20, 1943  2 Sheets-Sheet 2

Ambrose Ridd
INVENTOR.

BY
ATTORNEYS.

Patented Aug. 28, 1945

2,383,685

UNITED STATES PATENT OFFICE 2,383,685

VULCANIZING APPARATUS

Ambrose Ridd, Louisville, Ky.

Application December 20, 1943, Serial No. 515,019

1 Claim. (Cl. 18—18).

This invention relates to vulcanizing devices designed for vulcanizing and repairing pneumatic tire casings, and aims to widen the scope of use and operation of the vulcanizing device shown and described in my patent application, Serial No. 459,167, allowed August 28, 1943, now Patent No. 2,340,692.

An object of the invention is to provide a vulcanizing apparatus of the reversible type, which may be used in vulcanizing from a position within the casing, as well as from a point exteriorly thereof.

Another object of the invention is to provide a portable vulcanizing apparatus constructed in such a way that it may be used in vulcanizing substantially large ruptures or breaks in tire casings.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings.

Figure 1:
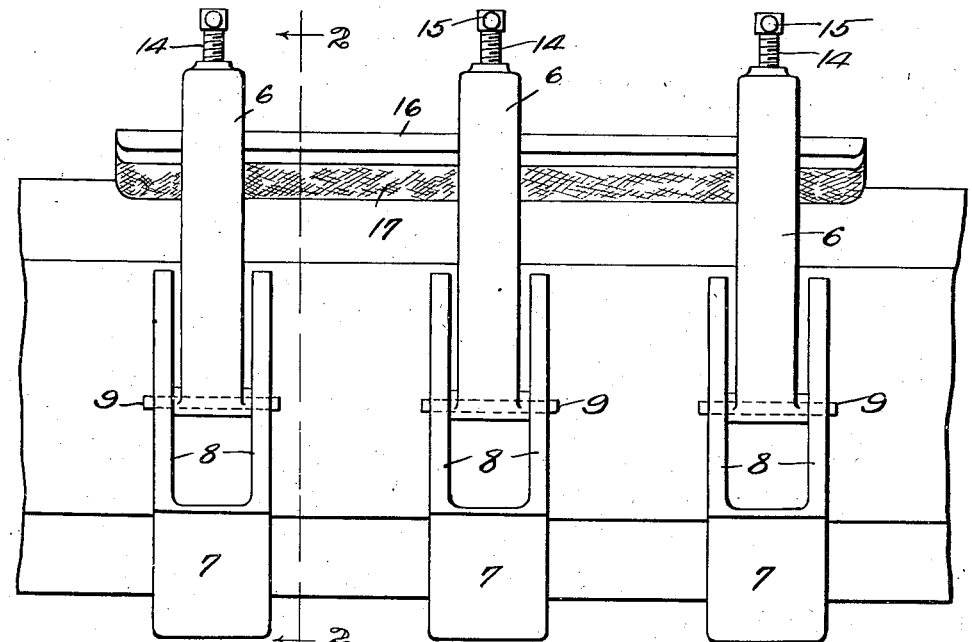
Figure 1 is an elevational view of a vulcanizing apparatus constructed in accordance with the invention, and illustrating the apparatus as positioned exteriorly of a tire casing wherein a substantially large casing rupture is to be vulcanized.

Referring to the drawings in detail the reference character 5 designates the solid core of the apparatus, which is of a diameter slightly less than the interior diameter of the casing with which it is to be used. This core may be of any desired length and curved to conform to the shape of the inner surface of the casing with which it is used.

Figure 2:
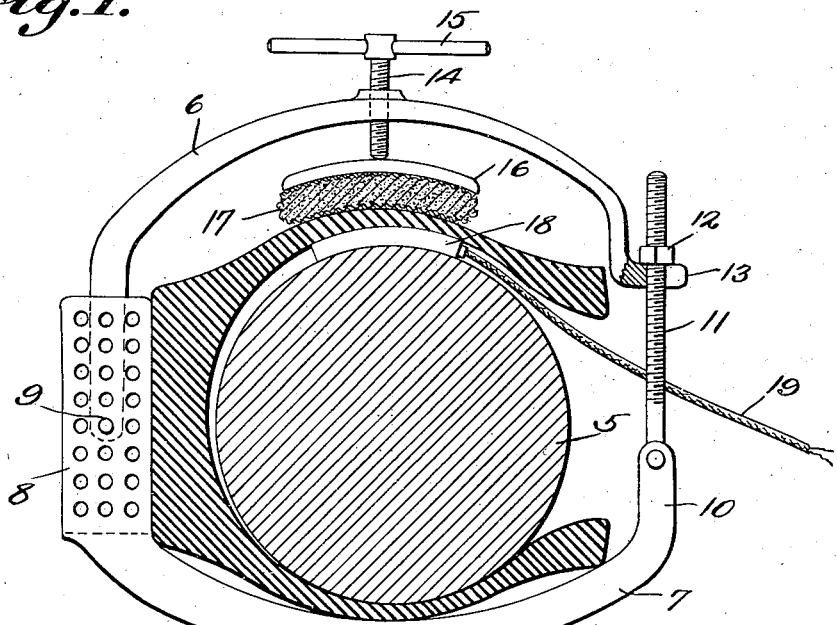
Figure 2 is a sectional view taken on line 2—2 of Figure 1.

The apparatus also includes upper and lower clamping arms 6 and 7 respectively, the clamping arm 7 being formed with spaced plates 8 which are formed with a plurality of openings through which the pin 9 is extended, in pivotally connecting the clamping arms. The upper clamping arm is formed with an opening which is adapted to align with the openings of the plates 8, to receive the pin 9. The clamping arm 7 is formed with an upwardly extended end 10, to which the theaded rod 11 is pivotally connected, the rod 11 being supplied with a nut 12. The upper clamping arm 6 which is curved to fit around one side of the tire casing being repaired, is formed with an end portion 13 that is formed with a notch to receive the threaded rod 11, as shown by Figure 2 of the drawings. After the rod 11 has been positioned within the notch, the nut 12 may be operated to draw the free ends of the arms toward each other to clamp the heating element and supporting pad in position against the tire casing, during the vulcanizing operation. The arm 6 is formed with a threaded opening in which the screw 14 is positioned, the screw being provided with a bar 15, whereby the screw may be conveniently rotated.

The screw 14 cooperates with the steel contact plate 16, which may be of any desired length, the contact plate being curved transversely to conform to the curvature of a tire casing. Resting against the contact plate 16, is a pressure bag 17 which embodies a casing constructed of flexible material, and filled with granular material, such as sand or the like which will conform to the shape of the tire casing, when pressure is brought to bear thereagainst, by said screw 14.

Cooperating with the pressure bag, is a heating element indicated by the reference character 18 which is of the electrical type, and is connected with a source of electricity supply, through the wire 19.

When it is desired to apply the heat in vulcanizing a ruptured portion of a tire casing, from the interior of the casing, the heating element 18 is positioned in a manner as shown by Figure 2 of the drawings, and the pressure bag 17 is placed directly over the heating element, the contact plate 16 resting thereon. Because of the curved construction of the contact plate 16, it will be obvious that when pressure is applied thereto, the pressure bag will conform to the shape of the contact plate to direct even pressure throughout the entire upper and lower surfaces of the pressure bag.

Figure 3:
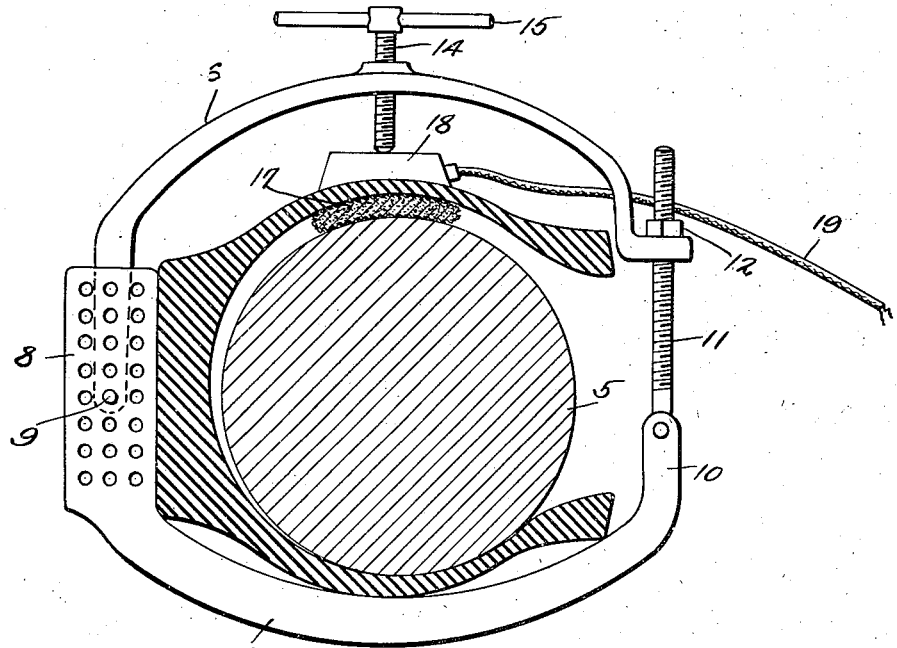
Figure 3 is a sectional view illustrating the vulcanizing apparatus as reversed, in vulcanizing a ruptured portion of a casing, from a point exteriorly of the casing.
Figure 4:
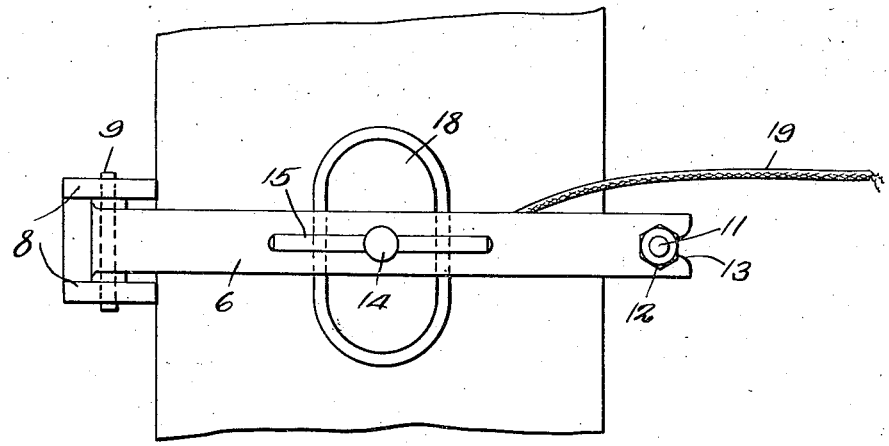
Figure 4 is a plan view thereof.

When it is desired to apply the heat exteriorly of the casing, the pressure bag is reversed and positioned against the core 5 as shown by Figure 3. The heating element is now placed against the outer surface of the casing, directly over the pressure bag, and the screw 14 is operated to exert pressure on the heating element forcing the heating element into close engagement with the tire casing which is clamped between the heating element and pressure bag. By applying heat to the casing through the medium of the heating element, the vulcanizing result will be accomplished.

As shown by Figure 1 of the drawings, I have used three sets of clamping arms in clamping a substantially long contact plate and pressure bag positioned on a tire casing. This type of vulcanizing apparatus is designed for use in vulcanizing large breaks or ruptures in tire casings.

It might be further stated that the heating elements, contact plates and pressure bags may be made of various lengths, thereby adapting the vulcanizing apparatus for universal use.

Due to the fact that the clamping arms may be adjusted to various positions with respect to each other, the apparatus may be regulated or adjusted, for use in vulcanizing tire casings of various diameters.

What is claimed is:

A portable tire vulcanizing apparatus, comprising in combination, a solid core shaped to fit the interior of a tire casing and contact with the inner surface of the tire casing, a portable heating element curved to fit over the solid core between the core and casing under repair, a body portion embodying pivoted arms, adapted to be fitted around the tire casing in spaced relation therewith, a flexible pressure bag adapted to fit against the outer surface of the tire in which the core is positioned and conform to the contour of the outer surface of the tire, a curved pressure plate curved to conform to the contour of the tire casing fitted over the flexible pressure bag, a pressure screw on the body portion adapted to engage the pressure plate and direct pressure to the pressure plate and pressure bag, clamping the tire casing between the flexible bag, heating element and core.

AMBROSE RIDD.